(12) United States Patent
Wu et al.

(10) Patent No.: US 8,663,848 B2
(45) Date of Patent: Mar. 4, 2014

(54) C2/M-STRUCTURED CATHODE MATERIAL FOR LITHIUM-ION BATTERY

(75) Inventors: Maw-Kuen Wu, Taipei (TW); Tzu-Wen Huang, Keelung (TW); Horng-Yi Tang, Taichung (TW); Hua-Shu Chang, New Taipei (TW); Chui-Chang Chiu, Taoyuan County (TW); Kuo-Wei Yeh, Taipei (TW); Chung-Chieh Chang, Taichung (TW)

(73) Assignees: LICO Technology Corp., New Taipei (TW); Academia Sinica, Taipei (TW)

( * ) Notice: Subject to any disclaimer, the term of this patent is extended or adjusted under 35 U.S.C. 154(b) by 122 days.

(21) Appl. No.: 13/296,931

(22) Filed: Nov. 15, 2011

(65) Prior Publication Data

US 2012/0258364 A1  Oct. 11, 2012

(30) Foreign Application Priority Data

Apr. 7, 2011 (TW) ............................. 100112039 A
Jun. 23, 2011 (TW) ............................. 100122025 A (51) Int. Cl.
*H01M 4/131* (2010.01)

(52) U.S. Cl.
USPC ... 429/231.3; 429/223; 429/224; 429/231.95; 252/182.1

(58) Field of Classification Search
USPC .................. 429/231.3, 223, 338, 224, 231.95; 252/182.1; 423/599, 594.4, 594.6
See application file for complete search history.

(56) References Cited

U.S. PATENT DOCUMENTS

| 2003/0022063 A1* | 1/2003 | Paulsen et al. ............. 429/231.3 |
| 2005/0019659 A1* | 1/2005 | Shiozaki et al. ........... 429/231.3 |
| 2007/0122705 A1* | 5/2007 | Paulsen et al. ............. 429/231.3 |
| 2010/0233550 A1* | 9/2010 | Yanagida et al. ............. 429/338 |

FOREIGN PATENT DOCUMENTS

| JP | 2012-038564 | 2/2012 |
| WO | WO 2011/021686 | 2/2011 |

* cited by examiner

*Primary Examiner* — Kenneth Douyette
(74) *Attorney, Agent, or Firm* — Davidson, Berquist, Jackson & Gowdey L.L.P.

(57) ABSTRACT

Disclosed is a C2/m-structured cathode material for a lithium-ion battery. The cathode material includes a lithium transition metal oxide represented by a formula of:

$Li(Li_wNi_xCo_yMn_z)O_2$, wherein

$w+x+y+z=1$, $0.42 \leq z \leq 0.60$, $0.30 \leq x+y \leq 0.55$, any of w, x, and y is larger than 0, and
the cathode material having a single-phase structure with a space group of C2/m.
A lithium-ion battery containing the C2/m-structured cathode material is also disclosed.

2 Claims, 9 Drawing Sheets

C2/M-STRUCTURED CATHODE MATERIAL FOR LITHIUM-ION BATTERY

CROSS-REFERENCE TO RELATED APPLICATIONS

This application claims priority of Taiwanese Application No. 100112039, filed Apr. 7, 2011, and Taiwanese Application No. 100122025, filed Jun. 23, 2011.

BACKGROUND OF THE INVENTION

1. Field of the Invention

The invention relates to a C2/m-structured cathode material, and more particularly to a C2/m-structured cathode material for a lithium-ion battery. The invention also relates to a lithium-ion battery containing the C2/m-structured cathode material.

2. Description of the Related Art

A lithium-ion battery generally includes an anode containing $Li_xC$, a cathode containing metal oxide or phosphate, a polymeric separator for separating the anode from the cathode, and an organic electrolyte solution containing a lithium salt. Conventional cathode materials include a layered-type oxide of $Li_xMO_2$ (M=Co or Ni), Spinel structured $Li_xMn_2O_4$, or Olivine structured $Li_xFePO_x$. For the layered-type oxide of $Li_xMO_2$, however, x is required to be equal to or larger than 0.5 in view of structural stability of the cathode material, and specific capacity of the layered-type oxide of $Li_xMO_2$ is typically lower than 140 mAh/g.

WO 2008/137241 A2, which corresponds to US 2008/0280205, discloses a layer-structured cathode composition for a lithium-ion battery. The cathode composition has a formula of $Li[Li_xMn_aNi_bCo_cM^1_dM^2_e]O_2$, wherein $M^1$ and $M^2$ are different metals and are not Mn, Ni, or Co; x+a+b+c+d+e=1; −0.5≤x≤0.2; 0≤a≤0.80; 0≤b≤0.75; 0≤c≤0.88; 0≤d+e≤0.30; and at least one of d and e is larger than 0. The cathode composition has a space group of R-3m, and is in a form of a single phase having a layered $O_3$ crystal structure. The cathode composition has a stable interlayer structure and is not liable to collapse due to movement of lithium ions from and to the layer-structured cathode composition. Therefore, the structural stability and the specific capacity can be enhanced. However, the specific capacity of the layer-structured cathode composition is usually not greater than 180 mAh/g.

SUMMARY OF THE INVENTION

An object of the present invention is to provide a C2/m-structured cathode material for a lithium-ion battery, which can have superior specific capacity over the prior art.

Another object of the present invention is to provide a lithium-ion battery including the C2/m-structured cathode material of the present invention.

In one aspect of this invention, a C2/m-structured cathode material for a lithium-ion battery includes a lithium transition metal oxide represented by a formula of:

$Li(Li_wNi_xCo_yMn_z)O_2$, wherein $0.42 \leq z \leq 0.60$, $0.30 \leq x+y \leq 0.55$ any of w, x, and y is larger than 0, and the cathode material having a single-phase structure with a space group of C2/m.

In another aspect of this invention, a lithium-ion battery includes an anode, a cathode, an electrolyte, and a separator separating the anode from the cathode. The cathode contains a C2/m-structured cathode material including a lithium transition metal oxide represented by a formula of:

$Li(Li_wNi_xCo_yMn_x)O_2$, wherein $w+x+y+z=1$, $0.42 \leq z \leq 0.60$, $0.30 \leq x+y \leq 0.55$, any of w, x, and y is larger than 0, and the cathode material having a single-phase structure with a space group of C2/m.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

As described above, the C2/m-structured cathode material for a lithium-ion battery of the present invention includes a lithium transition metal oxide represented by a formula of:

$Li(Li_wNi_xCo_yMn_z)O_2$, wherein $0.42 \leq z \leq 0.60$, preferably $0.48 \leq z \leq 0.60$, and more preferably, $0.48 \leq z \leq 0.54$,

$0.30 \leq x+y \leq 0.55$, any of w, x, and y is larger than 0, preferably, $0.02 \leq w \leq 0.20$, $0.26 \leq x \leq 0.44$, and $0.02 \leq y \leq 0.12$, and more preferably, $0.02 \leq w \leq 0.14$, and the cathode material having a single-phase structure with a space group of C2/m.

When z is not larger than 0.42, the lattice may assume the structure of $O_3$. When z is larger than 0.60, the single-phase structure with the space group of C2/m may not be maintained. When x+y<0.30 or x+y>0.55, the single-phase structure with the space group of C2/m may not be maintained.

The arrangement of oxygen atom layers in the cathode material of the present invention can be controlled to be in a form of "ABAB", such as that shown below, via the single-phase structure with a space group of C2/m. The lithium ions in the lattices can be substantially completely released during the charge/discharge period without negatively affecting the structural stability and the oxygen atom layer stability in the C2/m-structured cathode material. Therefore, the mobility of the lithium ions between the oxygen atom layers can be enhanced.

Figure 1:
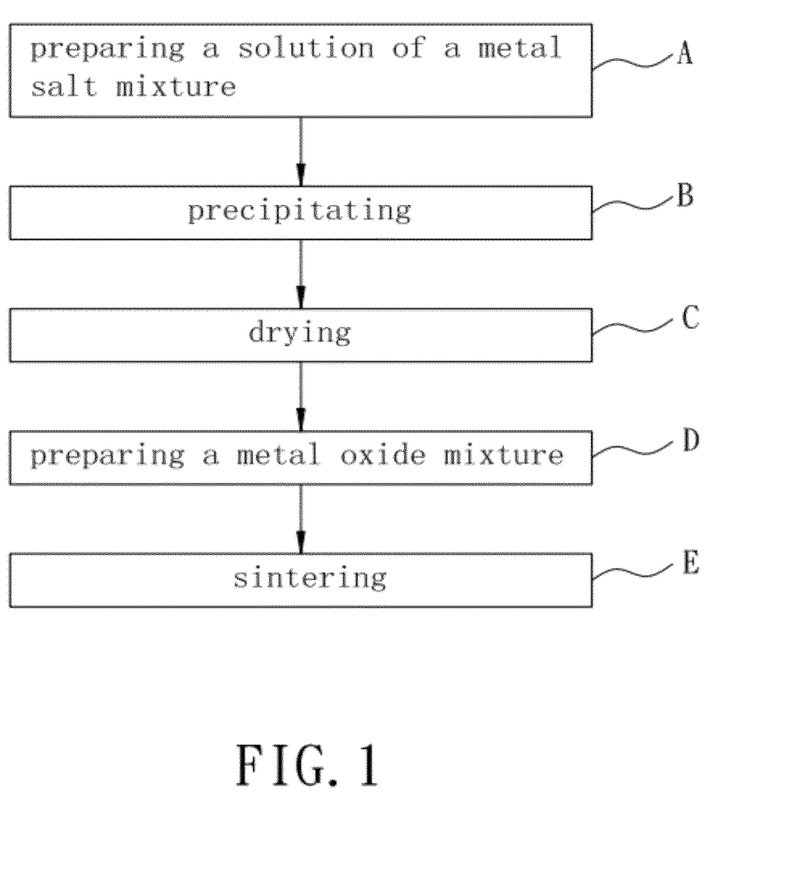
FIG. 1 is a flow chart of a method for producing a C2/m-structured cathode material for a lithium-ion battery according to the present invention.

Referring to FIG. 1, a method for producing a C2/m-structured cathode material for a lithium-ion battery according to the present invention includes the steps of:

A) Preparing a Solution of a Metal Salt Mixture:

Nickel nitrate ($Ni(NO_3)_2$), cobalt nitrate ($Co(NO_3)_2$), and manganese nitrate ($Mn(NO_3)_2$) are mixed in water to prepare a solution of a metal nitrate mixture.

B) Precipitating:

The solution of the metal nitrate mixture is added dropwise to an alkaline hydroxide solution to form a precipitated precursor.

C) Drying:

The precipitated precursor is dried. Preferably, the precipitated precursor is washed 5 to 6 times with water and then filtered prior to drying.

D) Preparing a Metal Oxide Mixture:

The dried precursor is mixed with lithium carbonate ($Li_2CO_3$) to form a metal oxide mixture.

E) Sintering:

The metal oxide mixture is sintered at a temperature from 800° C. to 950° C. to obtain the cathode material of the present invention having a single-phase structure with a space group of C2/m.

The C2/m-structured cathode material of the present invention can be produced using other suitable methods. For example, metal oxides, metal hydroxide, and/or metal carbonate containing nickel, manganese, cobalt, and/or lithium are mixed in a predetermined ratio to prepare a mixture, which is then sintered (by a solid state sintering) to produce the cathode material of the present invention having a single-phase structure with a space group of C2/m. Alternatively, metal citrates containing nickel, manganese, cobalt, and lithium are mixed in a sol-gel method or a hydrothermal method to prepare a precursor, which is then sintered to produce the cathode material of the present invention.

The lithium-ion battery of the present invention includes an anode, a cathode, an electrolyte, and a separator separating the anode from the cathode. The cathode contains a C2/m-structured cathode material including a lithium transition metal oxide represented by a formula of:

$$Li(Li_wNi_xCo_yMn_z)O_2,$$

$$w+x+y+z=1,$$

$0.42 \leq z \leq 0.60$, preferably $0.48 \leq z \leq 0.60$, and more preferably, $0.48 \leq z \leq 0.54$, $$0.3 \leq x+y \leq 0.55,$$

any of w, x, and y is larger than 0, preferably, $0.02 \leq w \leq 0.20$, $0.26 \leq x \leq 0.44$, and $0.02 \leq y \leq 0.12$, and more preferably, $0.02 \leq w \leq 0.14$, and the cathode material having a single-phase structure with a space group of C2/m.

The lithium ions in the lattices can be substantially completely released and are stably moveable between the anode and cathode using the cathode material having a single-phase structure with a space group of C2/m. Therefore, superior specific capacity over the prior art can be obtained.

Examples of the material suitable for the anode include, but are not limited to, lithium metal, lithium carbide ($Li_xC$), lithium-silicon alloy($Li_xSi$), lithium titanate ($Li_4Ti_5O_{12}$), tungsten oxide($WO_2$), silicon oxide ($SiO_x$), tin oxide($SnO_x$), and combinations thereof. The material for the electrolyte can be in a form of a solid state, a liquid state, a gel state, or combinations thereof. Examples of the material for the electrolyte in a solid state include, but are not limited to, polyethylene oxide, polytetrafluoroethylene, polyvinylidene fluoride (referred to as PVDF hereinafter), fluorine-containing copolymers polyacrylonitrile, and combinations thereof. Examples of the material for the electrolyte in a liquid state include, but are not limited to, ethylene carbonate (referred to as EC hereinafter), propylene carbonate, dimethyl carbonate, diethyl carbonate (referred to as DEC hereinafter), ethylmethyl carbonate, butylenes carbonate, vinylene carbonate, fluoroethylene carbonate, fluoropropylene carbonate, γ-butyrolactone, methyl difluoroacetate, ethyl difuoroacetate, dimethoxyethane, bis(2-methoxyethyl)ether, tetrahydrofuran dioxolane, lithium hexafluorophosphate ($LiPF_6$), and combinations thereof. Examples of the material for the electrolyte in a gel state include, but are not limited to, copolymer gel disclosed in U.S. Pat. No. 6,387,570, and terpolymer gel disclosed in U.S. Pat. No. 6,780,544.

The following examples are provided to illustrate the preferred embodiments of the invention, and should not be construed as limiting the scope of the invention.

Preparation of Cathode Material for a Lithium-Ion Battery

Example 1-1

Nickel nitrate ($Ni(NO_3)_2 \cdot 6H_2O$, 109.268 g), cobalt nitrate ($Co(NO_2)_2 \cdot 6H_2O$, 25.119 g), and manganese nitrate ($Mn(NO_3)_2 \cdot 5H_2O$, 199.058 g) were mixed in water in a molar ratio of 0.370:0.087:0.543 to prepare a solution of a metal nitrate mixture. The solution of the metal nitrate mixture was added dropwise to a sodium hydroxide solution (2.5 M) slowly to form a precipitated precursor ($(Ni_{0.370}Co_{0.087}Mn_{0.543}(OH)_2)$).

The precursor was purified by washing 5 to 6 times with water, filtering, and drying to obtain a purified solid precursor. The purified precursor (83.419 g) was mixed with lithium carbonate (40.141 g) in a molar ratio of 0.92:0.54 to obtain a metal oxide mixture, which was then sintered at a temperature of 900° C. for 10 hours to obtain a cathode material of $Li(Li_{0.08}Ni_{0.34}Co_{0.08}Mn_{0.50})O_2$. Formulation of the cathode material is summarized in Tables 1 and 2.

Example 1-2

A cathode material was fabricated according to the same method as Example 1-1 except for the following. Nickel nitrate (129.355 g), cobalt nitrate (12.036 g), and manganese nitrate (190.764 g) were mixed in water in a molar ratio of 0.438:0.042:0.521. The precursor thus formed is $Ni_{0.438}Co_{0.042}Mn_{0.521}(OH)_2$. The purified precursor (87.117 g) was mixed with lithium carbonate (38.655 g) in a molar ratio of 0.96:0.52. The cathode material obtained is $Li(Li_{0.04}Ni_{0.42}Co_{0.04}Mn0.50)O_2$. Formulation of the cathode material is summarized in Tables 1 and 2.

Example 1-3

A cathode material was fabricated according to the same method as Example 1-1 except for the following. Nickel nitrate (119.525 g), cobalt nitrate (18.439 g), and manganese nitrate (194.823 g) were mixed in water in a molar ratio of 0.404:0.064:0.532. The precursor thus formed is $Ni_{0.404}Co0.064Mn_{0.532}(OH)_2$. The purified precursor (85.268 g) was mixed with lithium carbonate (39.398 g) in a molar ratio of 0.94:0.53. The cathode material obtained is $Li(Li_{0.06}Ni_{0.38}Co_{0.06}Mn_{0.50})O_2$. Formulation of the cathode material is summarized in Tables 1 and 2.

Example 1-4

A cathode material was fabricated according to the same method as Example 1-1 except for the following. Nickel nitrate (98.556 g), cobalt nitrate (32.097 g), and manganese nitrate (203.481 g) were mixed in water in a molar ratio of 0.333:0.111:0.556. The precursor thus formed is $Ni_{0.333}Co_{0.111}Mn_{0.556}(OH)_2$. The purified precursor (81.570 g) was mixed with lithium carbonate (40.885 g) in a molar ratio of 0.90:0.55. The cathode material obtained is $Li(Li_{0.10}Ni_{0.30}Co_{0.10}Mn_{0.50})O_2$. Formulation of the cathode material is summarized in Tables 1 and 2.

Example 1-5

A cathode material was fabricated according to the same method as Example 1-1 except for the following. Nickel nitrate (94.076 g), cobalt nitrate (26.261 g), and manganese nitrate (216.430 g) were mixed in water in a molar ratio of 0.318:0.091:0.591. The precursor thus formed is $Ni_{0.318}Co_{0.091}Mn_{0.591}(OH)_2$. The purified precursor (79.636 g) was mixed with lithium carbonate (41.628 g) in a molar ratio of 0.88:0.56. The cathode material obtained is $Li(Li_{0.12}Ni_{0.28}Co_{0.08}Mn_{0.52})O_2$. Formulation of the cathode material is summarized in Tables 1 and 2.

TABLE 1

| | Molar ratio of nickel nitrate, cobalt nitrate, and manganese nitrate | Precursor |
|---|---|---|
| Ex. 1-1 | 0.370:0.087:0.543 | $(Ni_{0.370}Co_{0.087}Mn_{0.543}(OH)_2)$ |
| Ex. 1-2 | 0.438:0.042:0.521 | $(Ni_{0.438}Co_{0.042}Mn_{0.521}(OH)_2)$ |
| Ex. 1-3 | 0.404:0.064:0.532 | $(Ni_{0.404}Co_{0.064}Mn_{0.532}(OH)_2)$ |
| Ex. 1-4 | 0.333:0.111:0.556 | $(Ni_{0.333}Co_{0.111}Mn_{0.556}(OH)_2)$ |
| Ex. 1-5 | 0.318:0.091:0.591 | $(Ni_{0.318}Co_{0.091}Mn_{0.591}(OH)_2)$ |

TABLE 2

| | Molar ratio of precursor and lithium carbonate | Cathode material |
|---|---|---|
| Ex. 1-1 | 0.92:0.54 | $Li(Li_{0.08}Ni_{0.34}Co_{0.08}Mn_{0.50})O_2$ |
| Ex. 1-2 | 0.96:0.52 | $Li(Li_{0.04}Ni_{0.42}Co_{0.04}Mn_{0.50})O_2$ |
| Ex. 1-3 | 0.94:0.53 | $Li(Li_{0.06}Ni_{0.38}Co_{0.06}Mn_{0.50})O_2$ |
| Ex. 1-4 | 0.90:0.55 | $Li(Li_{0.10}Ni_{0.30}Co_{0.10}Mn_{0.50})O_2$ |
| Ex. 1-5 | 0.88:0.56 | $Li(Li_{0.12}Ni_{0.28}Co_{0.08}Mn_{0.52})O_2$ |

Preparation of Lithium-Ion Battery:

Example 2-1

Polyvinylidene difluoride (PVDE), super P carbon black, and the cathode material of Example 1-1 were added sequentially to N-methyl-2-pyrrolidone (NMP) with stirring to form a uniform slurry. The weight of NMP used in this example was equal to the total weight of PVDF, super P carbon black, and the cathode material. The slurry was then coated onto an aluminum foil of high purity using a doctor blade of 0.2 mm. The coated electrode was then dried in a vacuum oven set at 120° C. for 1 hour, followed by compacting using a roller to obtain a cathode.

Lithium metal of high purity was used as an anode. Electrolyte solution was Tinci TC-1216, which is composed of a lithium hexafluorophosphate solution (1M) dissolved in a mixture of EC and DEC in a molar ratio 1:1. The separator used in this example was double-layered PE (Celgard 2320).

Examples 2-2 to 2-5

Lithium-ion batteries of Examples 2-2 to 2-5 were fabricated according to the same method as Example 2-1 except that the cathode materials obtained from Examples 1-2 to 1-5 were respectively used for fabricating the cathodes of Examples 2-2 to 2-5.

Comparative Example

A lithium-ion battery was fabricated according to the same method as Example 2-1 except that $Li_{1.05}Ni_{1/3}Mn_{1/3}Co_{1/3}O_2$ (NM-3100, Japan) was used as the cathode material for fabricating the cathode. The cathode material used in the Comparative Example has a single-phase structure with a space group of R-3m.

Figure 2:
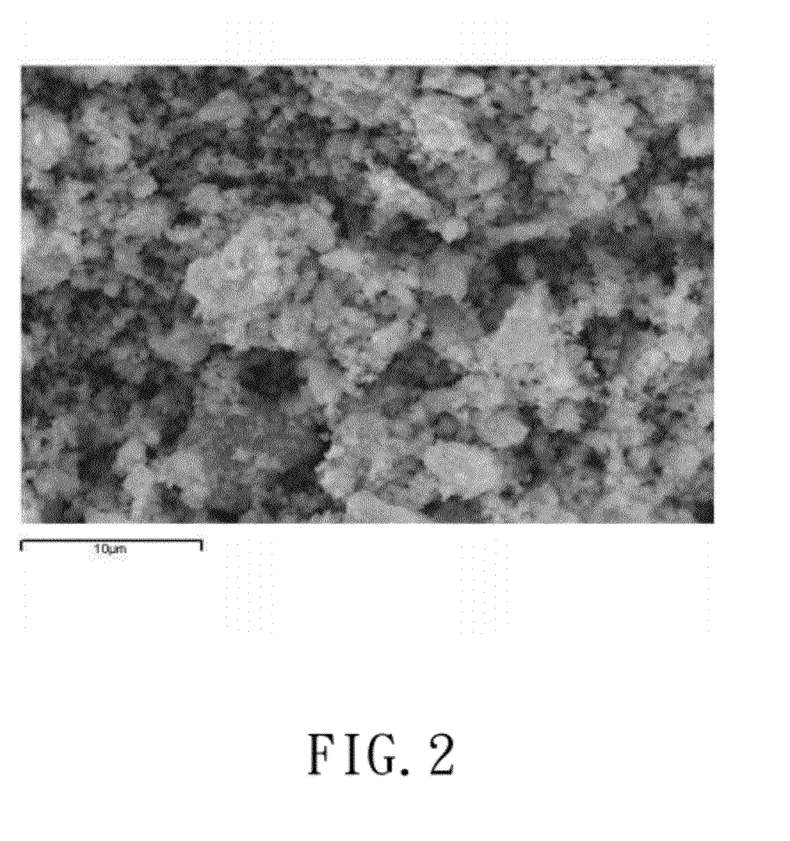
FIG. 2 is a scanning electron microscope image of a cathode material produced in Example 1-1.

Analysis:

(1) Synchrotron Radiation X-Ray Diffraction Analysis:

FIG. 2 shows a scanning electron microscope image captured from a cathode material produced in Example 1-1.

Figure 3:
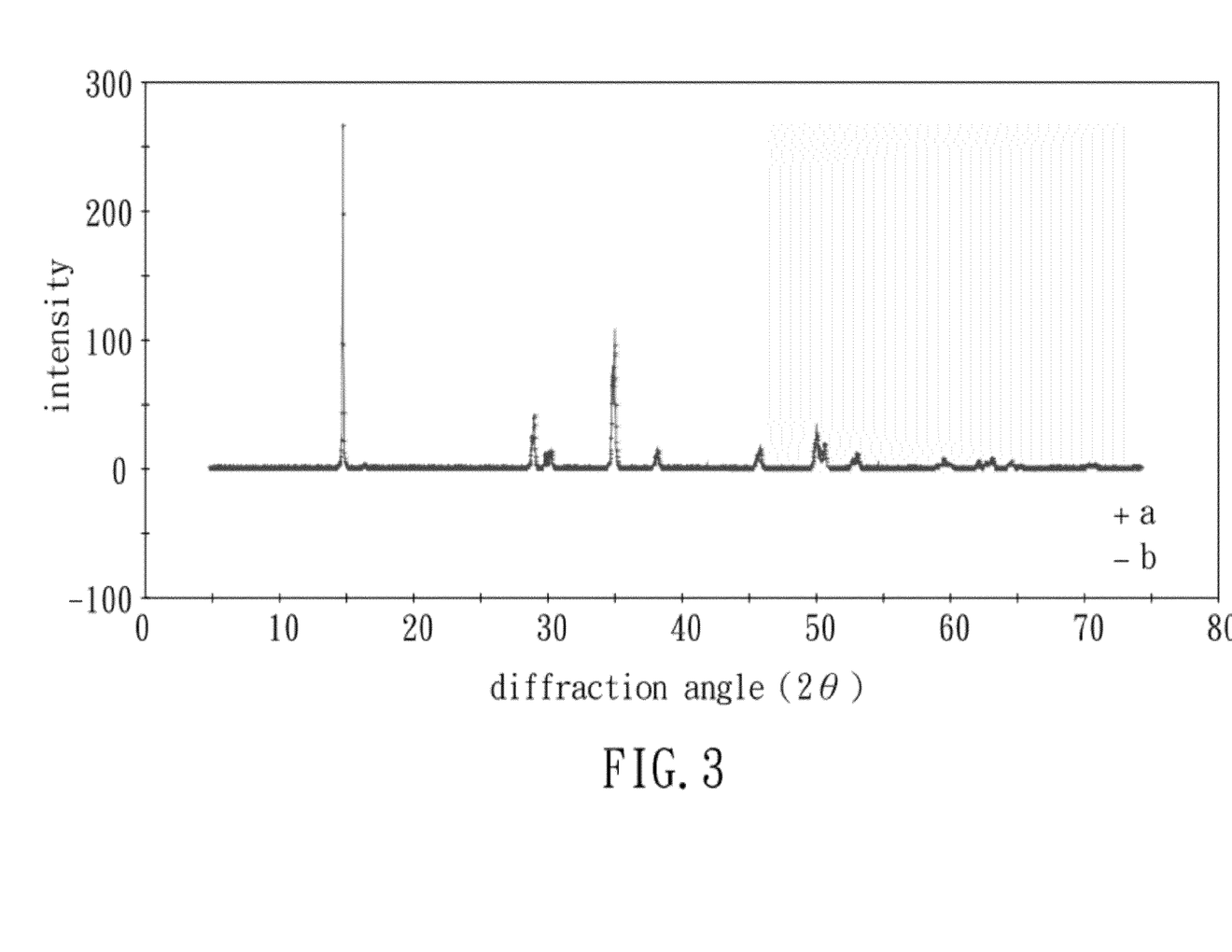
FIG. 3 illustrates spectra of the cathode material of Example 1-1 obtained from synchrotron radiation X-ray diffraction and a Rietveld computational method, respectively.

Referring to FIG. 3, a spectrum of the cathode material of Example 1-1 obtained from synchrotron radiation X-ray diffraction is shown in curve (a), and a fitting curve of the cathode material of Example 1-1 obtained from a Rietveld computational method (The Rietveld Method, edited by R. A. Young, Oxford University Press) is shown in curve (b). Curve (a) is substantially matched with curve (b) (Rwp %=9.8%). The calculated lattice parameters of the cathode material of Example 1-1 are: a=4.9997 Å, b=2.8602 Å, c=5.8086 Å, α=γ=90.000, β=125.0179. Therefore, it is confirmed that the cathode material produced in Example 1-1 has a single-phase structure with a space group of C2/m.

Figure 4:
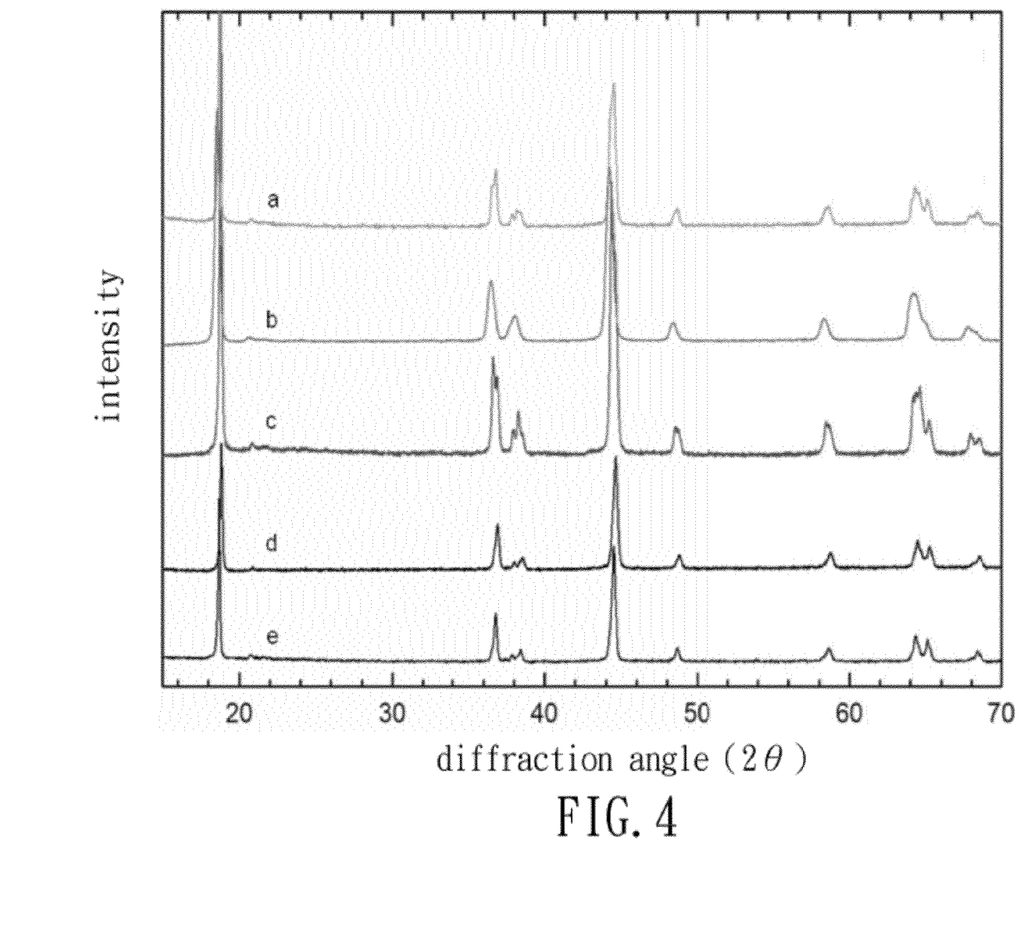
FIG. 4 illustrates powder X-ray diffraction spectra of the cathode materials produced in Examples 1-1 to 1-5.

(2) Powder X-Ray Diffraction Spectrum Analysis:

Referring to FIG. 4, powder X-ray diffraction spectra of the cathode materials produced in Examples 1-1 to 1-5 were obtained and are shown in curves (a), (b), (c), (d), and (e), respectively. As shown in this figure, at the fingerprint area of the diffraction angle ranging from 30 to 40 degrees, curves (b), (c), (d), and (e) have the diffraction peak slitting substantially identical to curve (a). Therefore, it can be confirmed that the cathode materials produced in Examples 1-2 to 1-5 also have a single-phase structure with a space group of C2/m.

The charge/discharge curves of lithium-ion batteries produced in Examples 2-1 and Comparative Example were recorded using a charge/discharge rate of 0.2 C. The charge/discharge rate of 0.2 C means that a battery cell can be fully charged/discharged in 5 hours.

Figure 5:
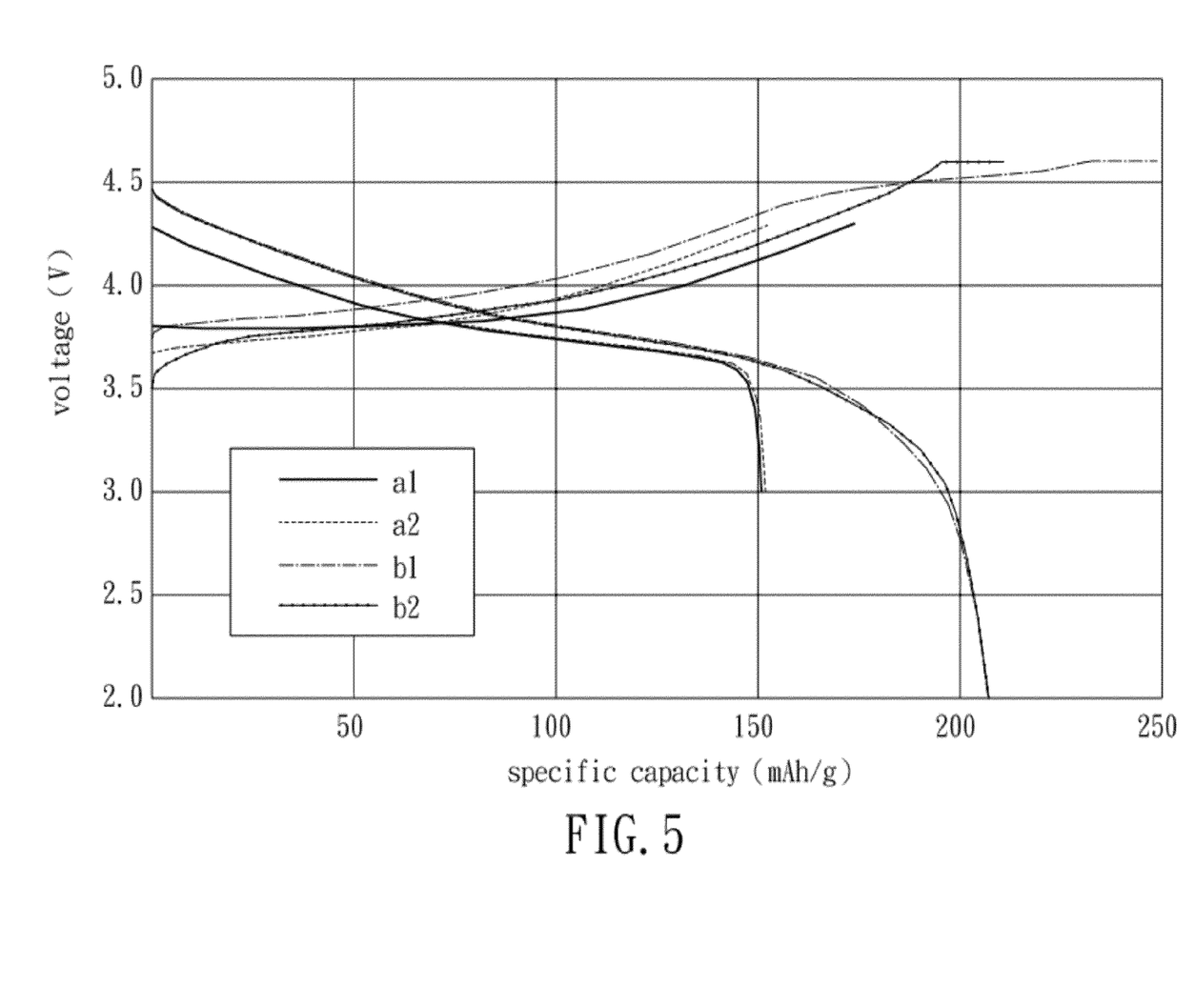
FIG. 5 illustrates charge/discharge curves of lithium-ion batteries produced in Examples 2-1 and Comparative Example.
Figure 6:
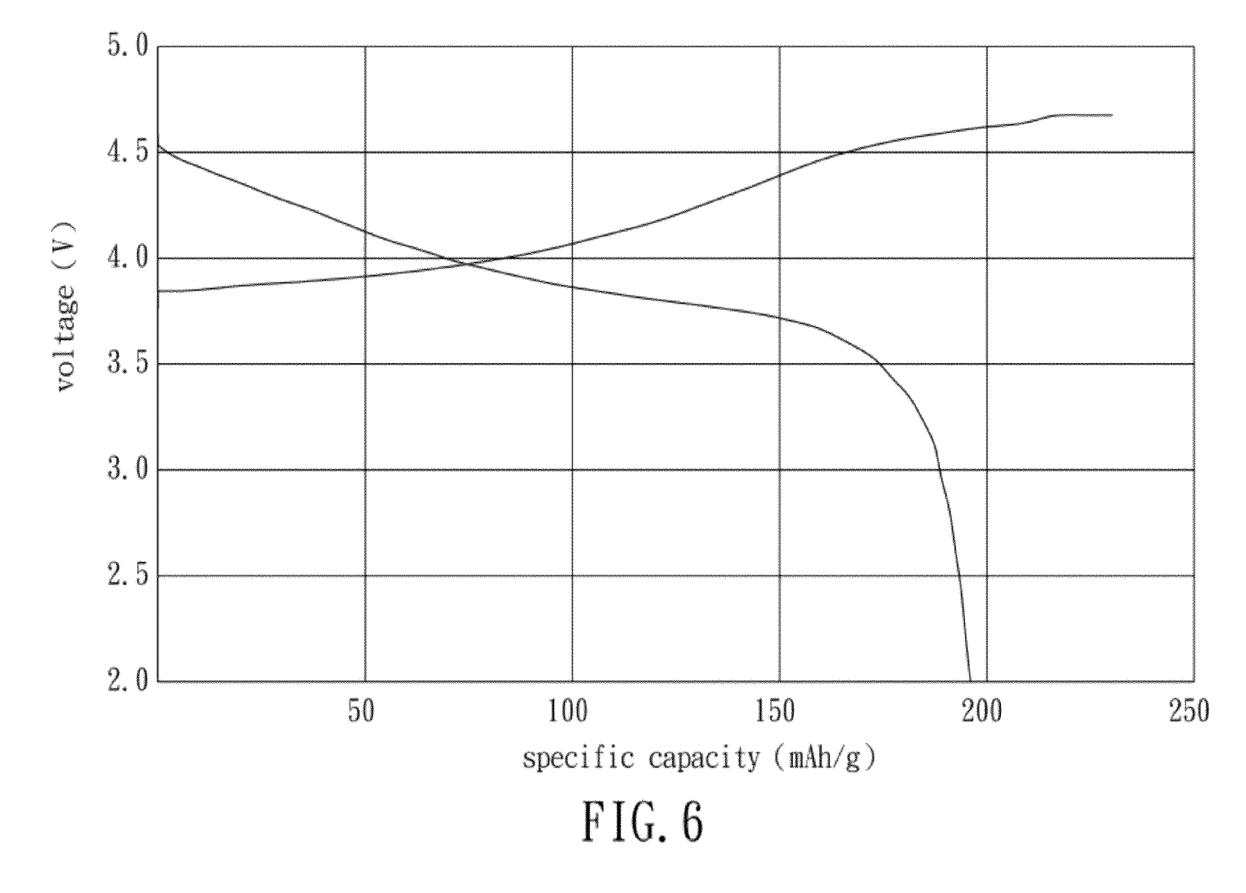
FIG. 6 illustrates charge/discharge curves of a lithium-ion battery produced in Example 2-2.
Figure 7:
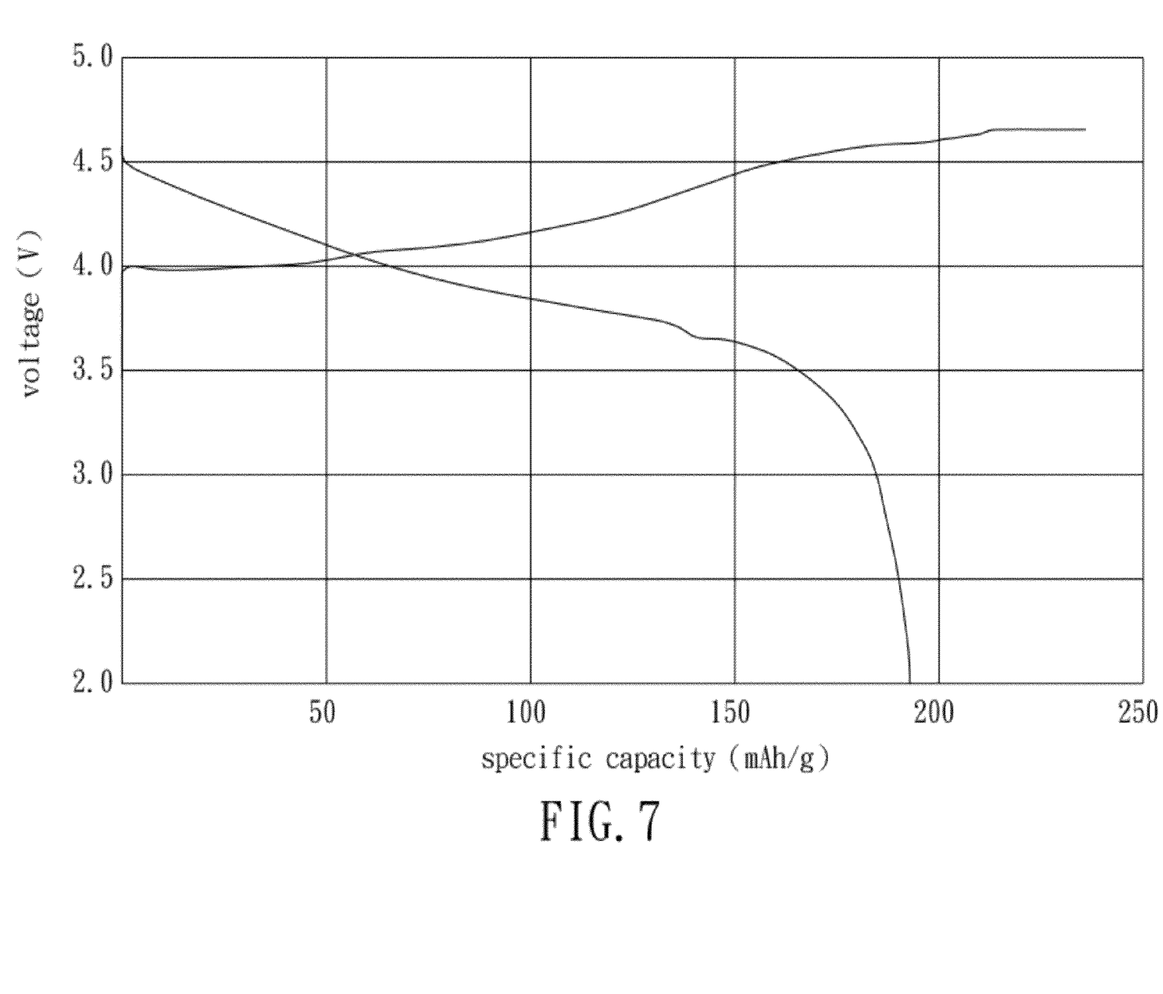
FIG. 7 illustrates charge/discharge curves of a lithium-ion battery produced in Example 2-3.
Figure 8:
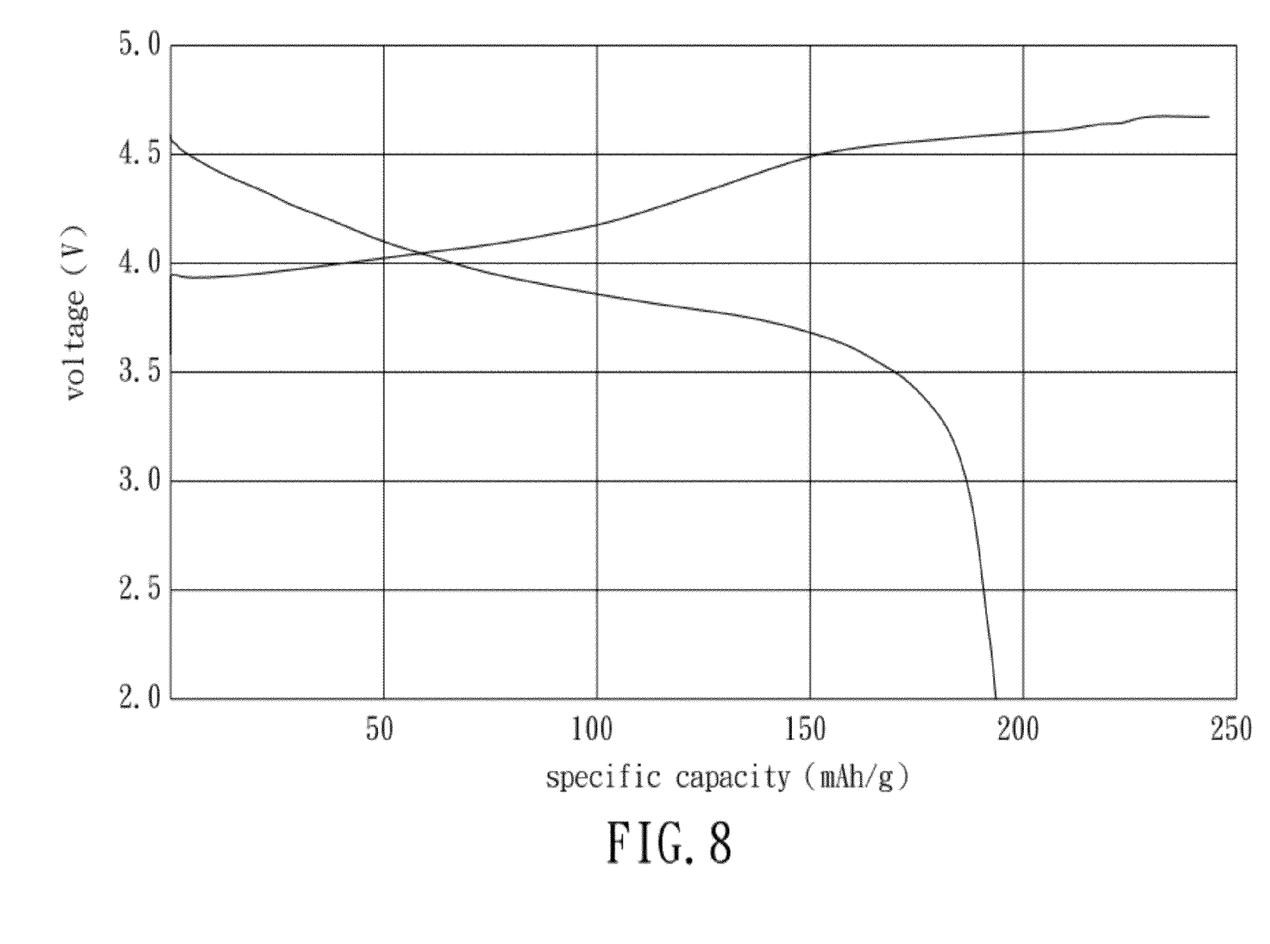
FIG. 8 illustrates charge/discharge curves of a lithium-ion battery produced in Example 2-4.
Figure 9:
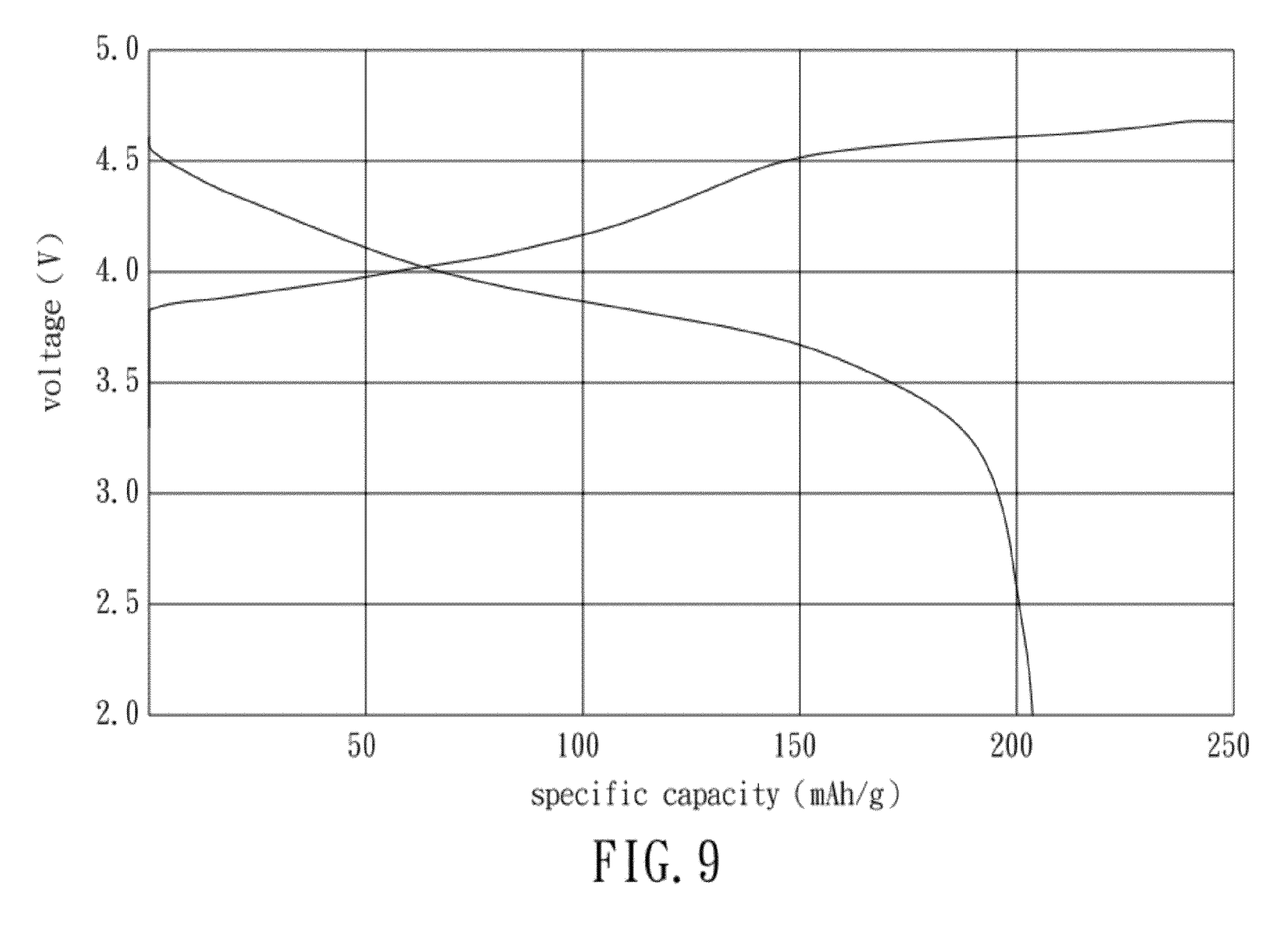
FIG. 9 illustrates charge/discharge curves of a lithium-ion battery produced in Example 2-5.

Referring to FIG. 5, the first charge/discharge curve of the lithium-ion battery of Comparative Example is shown in curve (a1), the second charge/discharge curve of the lithium-ion battery of Comparative Example is shown in curve (a2), the first charge/discharge curve of the lithium-ion battery of Example 2-1 is shown in curve (b1), and the second charge/discharge curve of the lithium-ion battery of Example 2-1 is shown in curve (b2). As shown in this figure, as compared to the curves of the first and second discharges of the lithium-ion battery of Comparative Example, the curves of the first and second discharges of the lithium-ion battery of Example 2-1 substantially overlap with each other at the lower end portion of the curves, which means that the reproducibility of the discharge of the lithium-ion battery of Example 2-1 is superior over the reproducibility of the discharge of the lithium-ion battery of Comparative Example. Furthermore, the discharge specific capacity of the lithium-ion battery of Comparative Example is about 150 mAh/g, and the discharge specific capacity of the lithium-ion battery of Example 2-1 is over 200 mAh/g. Therefore, the specific capacity of the lithium-ion battery of Example 2-1 is enhanced over that of the lithium-ion battery of Comparative Example.

Referring to FIGS. 6, 7, 8, and 9, which illustrate the charge/discharges curves of the lithium-ion batteries fabricated in Examples 2-2, 2-3, 2-4, and 2-5, respectively, the discharge specific capacities of the lithium-ion batteries fabricated in Examples 2-2, 2-3, 2-4, and 2-5 are 196.7 mAh/g, 193.3 mAh/g, 193.2 mAh/g, and 204.4 mAh/g, respectively.

Among the lithium-ion batteries fabricated in Examples 2-1, 2-2, 2-3, 2-4, and 2-5, the lithium-ion battery fabricated in Example 2-1, which contains the cathode material (i.e., Li(Li$_{0.08}$Ni$_{0.34}$Co$_{0.08}$Mn$_{0.50}$)O$_2$) produced in Example 1-1, has best efficiency in terms of the specific capacity.

In view of the aforesaid, the cathode material and the lithium-ion battery containing the same of the present invention have the following advantages:

(1) The arrangement of oxygen atom layers in the cathode material of the present invention can be controlled to be in the form of "ABAB" via the single-phase structure with a space group of C2/m. About 70% to 90% of the lithium ions in the lattices can be released during the charge/discharge period without negatively affecting the capacity of the cathode material. Therefore, the mobility of the lithium ions between the oxygen atom layers can be enhanced.

(2) About 70% to 90% of the lithium ions in the lattices can be released and are stably moveable between the anode and cathode using the cathode material. Therefore, superior specific capacity over the prior art can be obtained.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A C2/m-structured cathode material for a lithium-ion battery, said cathode material comprising a lithium transition metal oxide represented by a formula of:

Li(Li$_w$Ni$_x$Co$_y$Mn$_z$)O$_2$, wherein $w+x+y+z=1$, $0.02 \leq w \leq 0.20$, $0.50 \leq z \leq 0.52$, $0.30 \leq x+y \leq 0.48$, any of w, x, and y is larger than 0,
said cathode material having a single-phase structure with a space group of C2/m, and
said lithium-ion battery has a discharge specific capacity not less than 193 mAh/g.

2. A lithium-ion battery comprising:
an anode;
a cathode;
an electrolyte; and
a separator separating said anode from said cathode;
said cathode containing a C2/m-structured cathode material including a lithium transition metal oxide represented by a formula of:

Li(Li$_w$Ni$_x$Co$_y$Mn$_z$)O$_2$, wherein $w+x+y+z=1$, $0.02 \leq w \leq 0.20$, $0.50 \leq z \leq 0.52$, $0.30 \leq x+y \leq 0.48$, any of w, x, and y is larger than 0,
said cathode material having a single-phase structure with a space group of C2/m, and
said lithium-ion battery has a discharge specific capacity not less than 193 mAh/g.

* * * * *